(12) United States Patent
Kerfoot

(10) Patent No.: US 7,651,611 B2
(45) Date of Patent: *Jan. 26, 2010

(54) DIRECTIONAL MICROPOROUS DIFFUSER AND DIRECTIONAL SPARGING

(75) Inventor: William B. Kerfoot, Falmouth, MA (US)

(73) Assignee: ThinkVillage-Kerfoot, LLC, Boulder, CO (US)

(*) Notice: Subject to any disclaimer, the term of this patent is extended or adjusted under 35 U.S.C. 154(b) by 97 days.

This patent is subject to a terminal disclaimer.

(21) Appl. No.: 11/485,223

(22) Filed: Jul. 12, 2006

(65) Prior Publication Data

US 2008/0011688 A1 Jan. 17, 2008

(51) Int. Cl.
*B01F 3/04* (2006.01)
*C02F 1/72* (2006.01)

(52) U.S. Cl. .............. 210/170.07; 210/198.1; 210/200; 210/220; 261/122.1

(58) Field of Classification Search ............ 210/747, 210/749, 170.07, 192, 198.1, 200, 758, 759, 210/760, 620, 220, 261; 261/122.1, 122.2, 261/123, 124, DIG. 42, DIG. 70

See application file for complete search history.

(56) References Cited

U.S. PATENT DOCUMENTS

| | | |
|---|---|---|
| 1,920,719 A | 8/1933 | Stich |
| 2,517,525 A | 8/1950 | Cummings |
| 2,845,185 A | 7/1958 | Winderweedle, Jr. |
| 2,946,446 A | 7/1960 | Herbert |
| 3,027,009 A | 3/1962 | Price |
| 3,206,178 A | 9/1965 | Lamb |
| 3,219,520 A | 11/1965 | Box |
| 3,276,994 A | 10/1966 | Andrews |
| 3,441,216 A | 4/1969 | Good |
| 3,570,218 A | 3/1971 | Finney |
| 3,669,276 A | 6/1972 | Woods |
| 3,708,206 A | 1/1973 | Hard et al. |
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |

(Continued)

FOREIGN PATENT DOCUMENTS

DE 3805200 9/1998

(Continued)

OTHER PUBLICATIONS

U.S. Appl. No. 10/745,939, filed Dec. 24, 2003 (pending).

(Continued)

*Primary Examiner*—Matthew O Savage
*Assistant Examiner*—Lucas Stelling
(74) *Attorney, Agent, or Firm*—Lathrop & Gage LLP

(57) ABSTRACT

A method for treating contaminates includes emitting plural streams of a fluid into a soil formation with the streams having different radii of influences in different directions. A direction microporous diffuser includes a holder member having plural compartments and plural hollow, elongated members having porous sidewalls, the plural hollow, elongated members supported in the plural compartments of the holder member with each hollow, elongated member including a an inlet port at a first end of the elongated member and second end of the elongated member being sealed.

24 Claims, 12 Drawing Sheets

U.S. PATENT DOCUMENTS

| | | |
|---|---|---|
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Schultz |
| 4,696,739 A | 9/1987 | Pedneault |
| 4,730,672 A | 3/1988 | Payne |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,362,400 A | 11/1994 | Martinell |
| 5,364,537 A | 11/1994 | Paillard |
| 5,375,539 A | 12/1994 | Rippberger |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,733 A | 9/1997 | Waldron, Sr. |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,210,955 B1 | 4/2001 | Hayes |
| 6,214,240 B1 | 4/2001 | Yasunaga et al. |
| 6,217,767 B1 | 4/2001 | Clark |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 | 3/2002 | Briggs et al. |
| 6,357,670 B2 | 3/2002 | Ganan-Calvo |
| 6,364,162 B1 * | 4/2002 | Johnson et al. ............ 222/61 |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 | 6/2003 | Kerfoot |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |
| 6,913,251 B2 | 7/2005 | Kerfoot |
| 6,921,477 B2 | 7/2005 | Wilhelm |
| 6,984,329 B2 | 1/2006 | Kerfoot |
| 7,022,241 B2 | 4/2006 | Kerfoot |
| 7,033,492 B2 | 4/2006 | Kerfoot |
| 7,131,638 B2 | 11/2006 | Kerfoot |
| 7,156,984 B2 | 1/2007 | Kerfoot |

| | | | |
|---|---|---|---|
| 7,208,090 | B2 | 4/2007 | Applegate et al. |
| 7,264,747 | B2 | 9/2007 | Kerfoot |
| 7,300,039 | B2 | 11/2007 | Kerfoot |
| 2002/0029493 | A1 | 3/2002 | Baek |
| 2002/0109247 | A1 | 8/2002 | Jager et al. |
| 2003/0029792 | A1* | 2/2003 | Kerfoot ............. 210/610 |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | |
|---|---|---|
| EP | 0402158 | 12/1990 |
| EP | 0546335 | 6/1993 |
| GB | 2005655 A | 4/1979 |
| GB | 2185901 A | 8/1987 |
| JP | 1-304838 | 12/1989 |
| JP | 3267196 | 11/1991 |
| JP | 4-171036 | 6/1992 |
| JP | 6-023378 | 1/1994 |
| JP | 09313834 A | 12/1997 |
| WO | WO 98/21152 | 5/1998 |
| WO | WO 99/54258 | 10/1999 |
| WO | WO 2005/063367 | 7/2005 |

OTHER PUBLICATIONS

U.S. Appl. No. 11/272,446, Office Action dated Jan. 22, 2008, 13 pages.
U.S. Appl. No. 11/272,446, Response to Office Action filed Jun. 23, 2008, 8 pages.
U.S. Appl. No. 11/272,446, Office Action dated Oct. 10, 2008, 13 pages.
U.S. Appl. No. 11/272,446, Response to Office Action filed Jan. 12, 2009, 13 pages.
U.S. Appl. No. 11/272,446, Notice of Allowance & Examiner Interview Summary mailed Mar. 27, 2009, 11 pages.
U.S. Appl. No. 11/485,080, Restriction Requirement dated May 11, 2007, 5 pages.
U.S. Appl. No. 11/485,080, Response to Restriction Requirement filed Jun. 11, 2007, 1 page.
U.S. Appl. No. 11/485,080, Office Action dated Jul. 20, 2007, 8 pages.
U.S. Appl. No. 11/485,080, Response to Office Action filed Jan. 4, 2008, 14 pages.
U.S. Appl. No. 11/485,080, Office Action dated Feb. 22, 2008, 8 pages.
U.S. Appl. No. 11/485,080, Response to Office Action filed Jun. 12, 2008, 13 pages.
U.S. Appl. No. 11/485,080, Advisory Action dated Jun. 26, 2008, 3 pages.
U.S. Appl. No. 11/485,080, Notice of Appeal filed Aug. 22, 2008, 1 page.
U.S. Appl. No. 11/485,080, Appeal Brief filed Oct. 22, 2008, 22 pages.
U.S. Appl. No. 11/485,080, Office Action dated Jan. 9, 2009, 8 pages.
U.S. Appl. No. 10/745,939, selected pages from Image File Wrapper dated Jun. 22, 2006 through Jul. 2, 2008, 110 pages.
*ThinkVillage-Kerfoot LLC* v. *Groundwater & Environmental Services, Inc.*, Complaint for Patent Infringement, US District Court for the District of Massachusetts, Oct. 7, 2008, 5 pages.
*ThinkVillage-Kerfoot LLC* v. *Groundwater & Environmental Services, Inc.*, Answer and Counterclaims, Civil Action No. 1:08-cv-11711-GAO, Dec. 5, 2008, 7 pages.
*ThinkVillage-Kerfoot LLC* v. *Groundwater & Environmental Services, Inc.*, Amended Answer and Counterclaims, Civil Action No. 1:08-cv-11711-GAO, Dec. 15, 2008, 7 pages.
*ThinkVillage-Kerfoot LLC* v. *Groundwater & Environmental Services, Inc.*, Plaintiff's Response to Defendant Groundwater & Environmental Services, Inc.'s Amended Counterclaims, Civil Action No. 1:08-cv-1711-GAO, Dec. 30, 2008, 5 pages.
U.S. Appl. No. 12/177,467 Notice of Allowance dated Sep. 2, 2009, 8 pages.
U.S. Appl. No. 11/485,080, Notice of Allowance dated Jul. 09, 2009, 4 pages.
Civil Action No. 1:08-cv-11711-GAO, Groundwater & Environmental Services, Inc.'s Supplemental Response to Plaintiffs Interrogatory Three, Jun. 25, 2009, 36 pages.
Civil Action No. 1:08-cv-11711-GAO, Groundwater & Environmental Services, Inc.'s Supplemental Response to Plaintiff's Interrogatories Three and Four, Jul. 6, 2009, 164 pages.

* cited by examiner

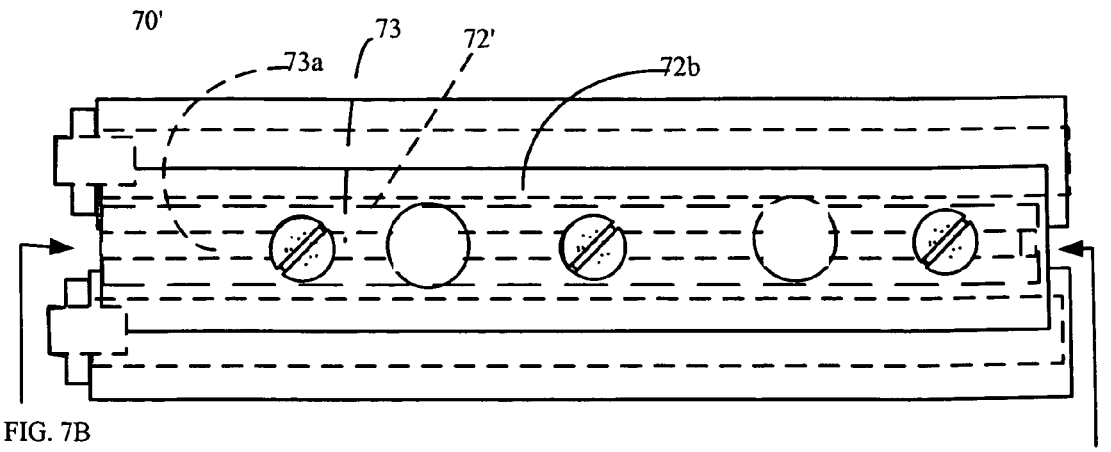
FIG. 7A
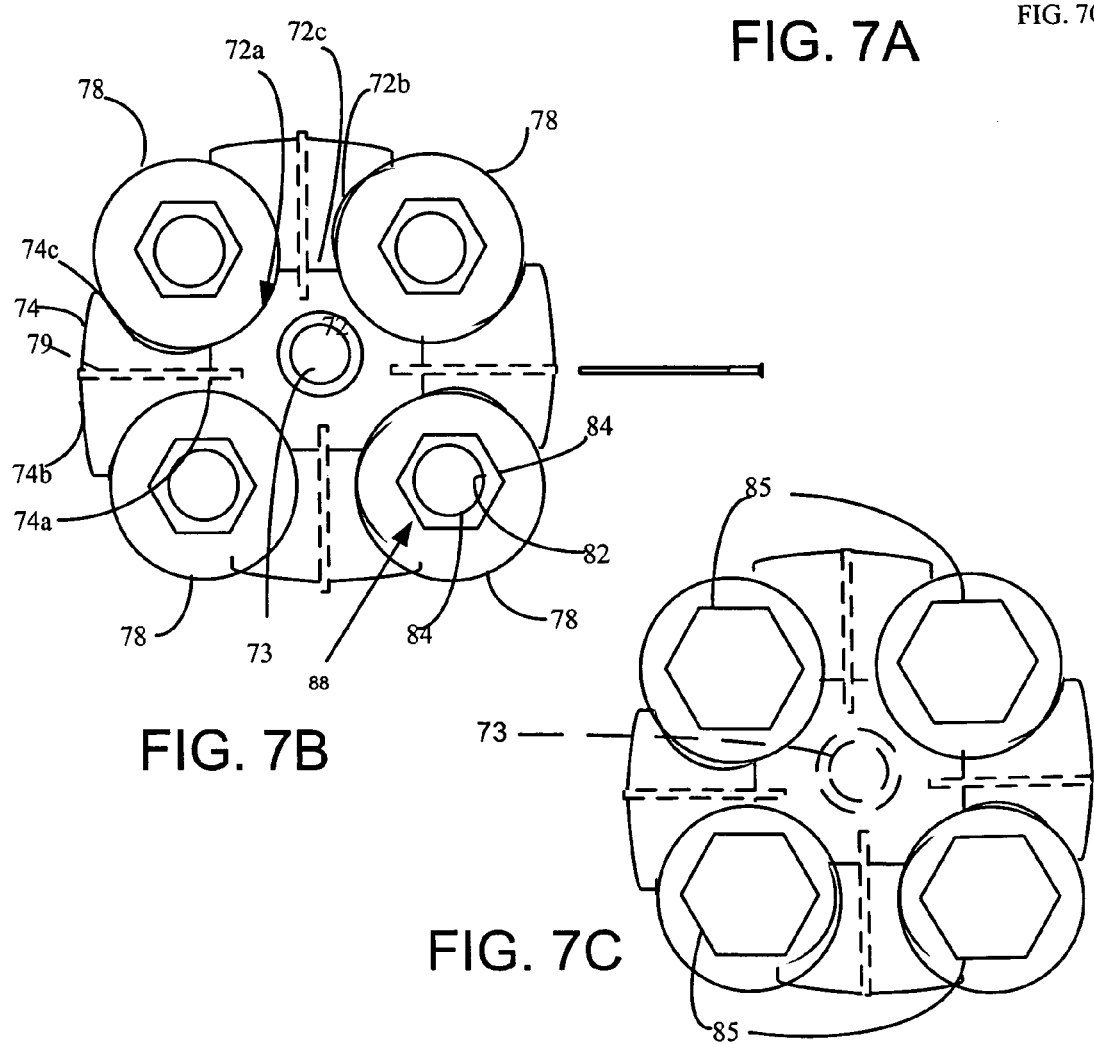
FIG. 7B
FIG. 7C

DIRECTIONAL MICROPOROUS DIFFUSER AND DIRECTIONAL SPARGING

BACKGROUND

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1,1 trichloroethane (TCA), dichloroethane (DCA), 1,4 dioxane, and very soluble gasoline additives such as methyl tertiary butyl ether (MTBE). Other contaminants may also be encountered.

SUMMARY

Often such contaminants are found in areas that are inaccessible, e.g. under parking lots, road beds buildings, airport runways, high-use highways, and the like where sparging techniques that require drilling of wells or driving of microporous diffusers directly into soils, close to or underneath such road beds, parking lots, buildings and the like may be impractical because of the large number of penetrations through reinforced concrete or surfaces sensitive to loading or proximity to heavily traveled or used area.

According to an aspect of this invention, a method includes delivering plural streams of a fluid to plural inlets of a diffuser comprised of plural hollow elongated members each having porous sidewalls and emitting at least one stream of the fluid into a soil formation through at least one of the plural hollow, elongated members.

Other aspects of the invention include that the inlets are coupled to one end of the plural hollow members with opposing ends of the members being sealed. The method includes sequencing fluids to the inlets to provide the plural streams in different sequences. The method includes controlling a solenoid controlled, multi-port valve to sequencing fluids to the inlets to provide the plural streams in different sequences. The diffuser is a microporous diffuser and includes a holder member supporting the plural hollow, elongated members in plural compartments of the holder member. The elongated members are comprised of well screen. The method includes emitting microbubbles having a bubble size of less than 200 microns. The method includes driving the diffuser into the ground. The method includes disposing the diffuser in a well. The diffuser emits microbubbles having a size in a range of 1 to 200 microns. The diffuser is comprised of 10 slot well-screen. The diffuser is comprised of a mesh having a mesh size in a range of 40 to 200 mesh.

According to a further aspect of the invention, an apparatus includes a plurality of directional diffusers arranged in a spaced arrangement to treat a site, a trunk line that delivers a fluid to the plurality of directional diffusers, a plurality of multi-port distribution valves in proximity to inlet ports of the directional diffusers; and for each of the multi-port distribution values and a plurality of feed lines coupled from the multi-port distribution value to inlets on the directional diffusers.

Other aspects of the invention include an ozone generator coupled to the trunk line and wherein the first fluid comprises ozone. The apparatus includes an air compressor coupled to the trunk line and an ozone generator coupled to the trunk line and wherein the first fluid comprises air-ozone. At least one of the directional diffusers has an inlet for receiving a flow of a second fluid. At least one of the directional diffusers includes an inlet for receiving a flow of a second fluid, that is surrounded by a plurality of inlets that receive flows of the first fluid. The diffuser is 10 slot well-screen and the apparatus includes a source of air-ozone as the first fluid and a source of a peroxide as the second fluid. The directional diffusers are microporous directional diffusers and the apparatus includes a source of air-ozone as the first fluid and a source of a peroxide as the second fluid. The directional diffuser includes a pointed member disposed on a portion of the directional diffuser to allow the directional diffuser to be driven into the ground. The directional diffuser is microporous having a pore size in a range of 0.1 to 200 microns. The directional diffuser is comprised of a mesh having a mesh size of at least 40 mesh. The directional diffuser is comprised of a mesh having a mesh size in a range of 40 to 200 mesh.

According to a still further aspect of the invention, an apparatus includes a holder member having plural compartments, plural hollow, elongated members having porous sidewalls, the plural hollow, elongated members supported in the plural compartments of the holder member with each hollow, elongated member including, an inlet port at a first end of the elongated member with the second end of the elongated member being sealed.

Other aspects of the invention include the holder member is elongated, with sidewalls of the plural hollow, elongated members having a porosity characteristic of 10 slot well-screen or less. Sidewalls of the plural elongated members have a porosity characteristic of less than 200 microns. The plural hollow, elongated members are cylinders. The plural, hollow elongated members are comprised of a metal or a plastic. The plural, hollow elongated members are comprised of a plastic that is a hydrophobic material. The plural, hollow elongated members are comprised of sintered, fused microscopic particles of plastic. The compartments have walls that have a curvature that corresponds to a curvature of the plural, hollow elongated members. The apparatus includes at least one band that is disposed about the plural members to hold the plural members in the compartments of the holder member. The compartments are arranged in quadrants. The holder member has a borehole through a length of the holder member. The apparatus includes an inlet attached to the holder member to feed fluid into the borehole in the holder member.

According to an aspect of this invention, a microporous diffuser includes a holder member having plural compartments, each compartment having a generally partially circular sidewall, plural hollow, cylindrical tubes having porous sidewalls, the plural hollow, cylindrical tubes supported in the plural compartments of the holder member with each hollow, cylindrical tube including, an inlet port at a first end of the cylindrical tubes with a second end of the cylindrical tube being sealed.

Other aspects of the invention include the holder member being elongated and with the cylindrical tubes having a porosity characteristic of 10 slot well-screen or less. The microporous diffuser has sidewalls of the cylindrical tubes have a porosity characteristic of less than 200 microns. The cylindrical tubes are comprised of a metal or a plastic. The microporous diffuser includes at least one member disposed to hold the plural cylindrical tubes in the compartments of the holder member. The compartments are arranged in quadrants and wherein there are four cylindrical tubes.

One or more advantages can be provided from the above. While, a non-directional microporous diffuser can enlarge its radius of influence (ROI) by placing the non-directional microporous diffuser deeper within an aquifer, e.g., a substantial distance below the contaminants, the directional microporous diffuser provides a mechanism that can discharge microbubbles over a broad lateral area while having directional microporous diffuser remain close to contaminated groundwater zones during sparging.

The directional microporous diffuser can cover broad lateral areas without diluting its effectiveness, since the oxidant gas emitted from the directional microporous diffuser can be emitted close to the source of contamination. It is possible that the effective radius of influence can be expanded, at least two-fold, without increasing the flow, by sequentially directing fluid from portions of the directional diffuser.

The lateral areas over which the microbubbles are emitted can be larger since all of the microbubbles emitted from the directional microporous diffuser can be directed into one area at a time.

The provision of multiple cylindrical members that are independently fed a fluid stream and independently controlled permits microbubbles to emerge from the directional microporous diffuser in accordance with which of the inlet ports of the directional microporous diffuser receives the fluid stream from the outlet ports of the solenoid-controlled valve. The directional microporous diffuser together with the solenoid valve permits a gas stream from the central feed to be directed through one, two, three or all four of the quadrants of the directional microporous diffuser. In general, using a single quadrant at a time permits the microbubbles to exit the directional microporous diffuser and provide a generally elliptical shaped zone of influence in the surrounding soil formation. The zone of influence will extend further in a direction perpendicular from the directional microporous diffuser than tangentially from the sidewalls of the directional microporous diffuser The solenoid-controlled valve can be controlled to rotate the pattern of microbubbles emitted from the directional microporous diffuser. Thus, microbubbles exit from only a first quadrant during a first time period, then only from a second quadrant during a second time period, and so forth. The control can be automated or manual. The directional microporous diffuser allows fewer wells and sparging arrangements to be constructed on a site for a given sparging arrangement capacity, since all of the capacity of the pumps and so forth can be directed into a single portion, e.g., quadrant of a microporous diffuser at any one time.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A-7C are diagrams depicting details of a directional diffuser in the example shown in FIG. 1A or 2B.

DETAILED DESCRIPTION

Figure 1A:
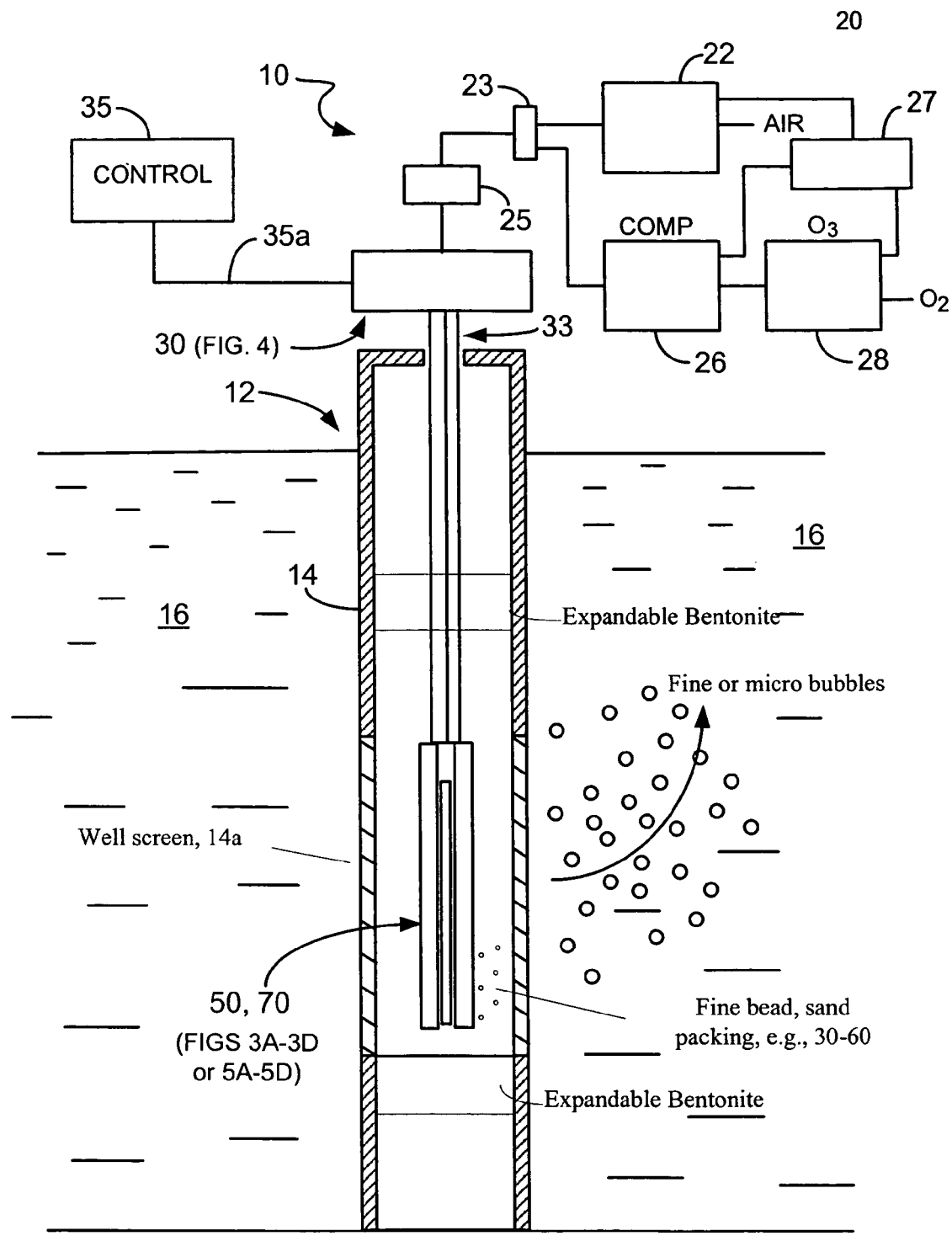
FIGS. 1A and 1B are cross-sectional views showing sparging treatment examples.

Referring now to FIG. 1A, a sparging arrangement 10 for treating plumes, sources, deposits or occurrences of contaminants, is shown. The arrangement 10 is disposed in a well 12 that has a casing 14 with screen 14a. The casing 14 supports the ground about the well 12. Disposed through the casing 14 are one or more directional microporous diffusers 50, 70 (discussed in FIGS. 3A-3C or 4A-4C).

The arrangement 10 also includes a first air compressor/pump 22 and a compressor/pump control mechanism 27 to feed a first fluid, e.g., air into a two port mixing valve 23 and a second pump 26 and coupled to a second source, e.g., an ozone generator 28 to feed ozone ($O_3$) to the mixing valve 23. Other arrangements are possible.

The mixing valve 23 is coupled via a check valve 25 to an inlet port of a solenoid-controlled valve 30. Solenoid-controlled valve 30, as shown in FIG. 4, has a common inlet port 31 and here four branch or outlet ports 32a-32d. A control arrangement 35 controls the solenoid-controlled valve 30. The control arrangement 35 can be a series of switches to actuate the solenoids, via lines 35a, or could be more complicated schemes. The gas mixture from the central mixing valve 23 is distributable to each of the outlet ports 32a-32d of the solenoid-controlled valve 30.

In some embodiments, packing material, e.g., sand may be disposed around the directional microporous diffuser 50, 70.

A conventional microporous diffuser can enlarge its radius of influence (ROI) by placing the microporous diffuser deeper within an aquifer, e.g., a substantial distance below the contaminants. However, this approach dilutes the effectiveness of such a microporous diffuser since the oxidant gas emitted from the conventional microporous diffuser travels vertically for some distance in order to reach the contaminants. Along the way some of the oxidant can dissolve, is absorbed or otherwise becomes ineffective. The directional microporous diffuser 50, 70 provides a mechanism that can cover broad lateral areas while staying close to contaminated groundwater zones.

Figure 1B:
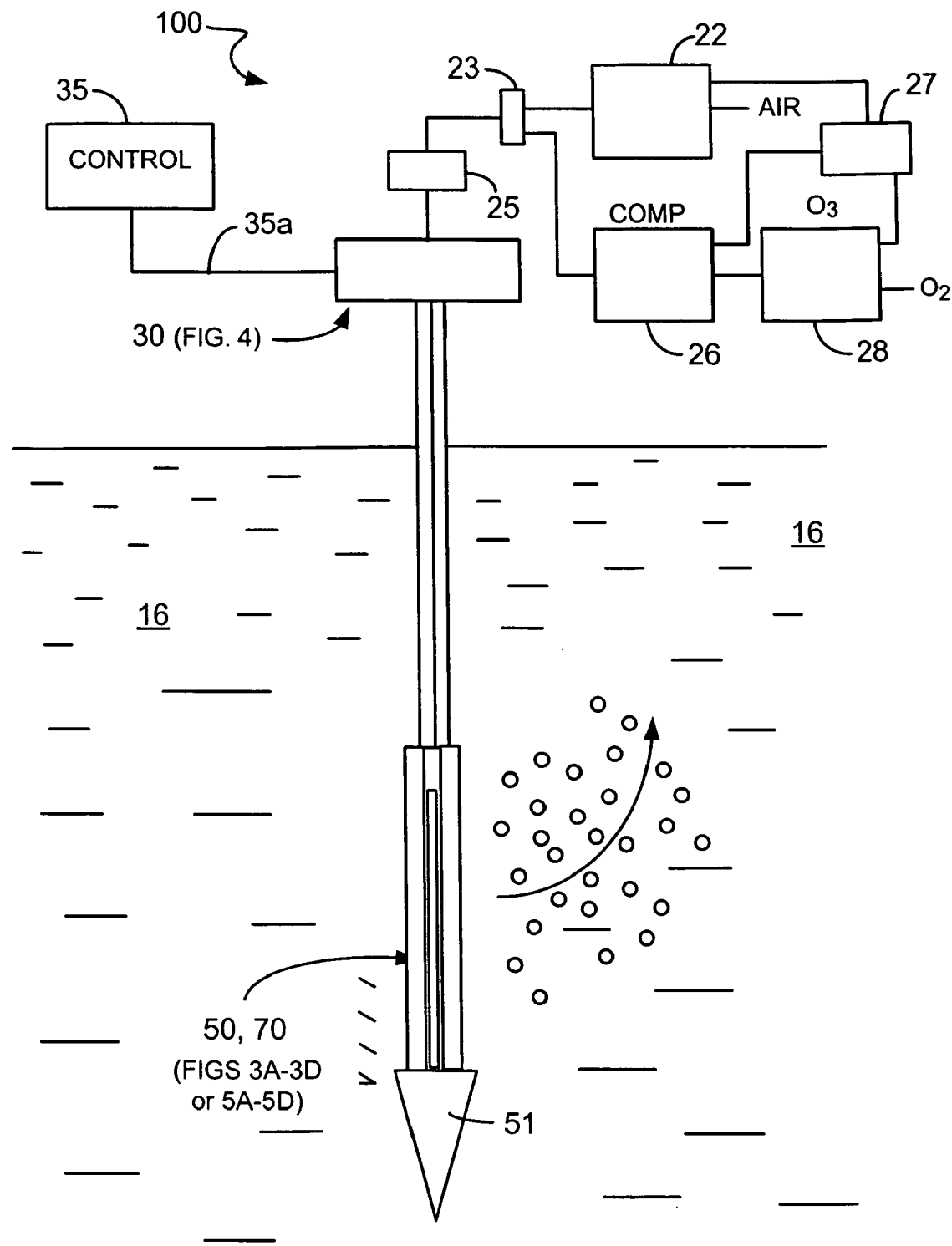

Referring now to FIG. 1B, an alternative sparging arrangement 100 for treating plumes, sources, deposits or occurrences of contaminants, is shown. The arrangement 100 includes one or more directional microporous diffusers 50, 70 (discussed in FIGS. 3A-3C and 4A-4C, respectively) disposed directly through a surrounding ground/aquifer region 16. As shown in FIG. 1B, the directional microporous diffusers 50, 70 are of a type that has a pointed member 51 on an end thereof to allow the pointed member to be driven or injected into the ground without the need for a well or casing as in FIG. 1A.

The arrangement 100 also includes the first air compressor/pump 22, the compressor/pump control mechanism 27, two port mixing valve 23, the second pump 26, ozone generator 28 and so forth as discussed above. The mixing valve 23 is coupled via a check valve 25 to an inlet port of a solenoid-controlled valve 30 controller via the control arrangement 35, as also discussed above.

In either arrangement 10 or 100, the outlet ports of the solenoid-controlled valve 30 are controlled by solenoids that selectively open and close the outlet ports 32a-32d permitting fluid to escape from one or more of the outlet ports 32a-32d. The outlet ports 32a-32d are coupled to feed lines generally 33 that are coupled to inlet fittings on a cap of the directional microporous diffuser 50, 70. The directional microporous diffuser 50, 70 allows microbubbles to be directed in selected directions into a surrounding soil formation 16, as discussed below.

In the embodiment described, a gas stream of ozone and air is delivered to the directional microporous diffuser 50, 70. Other fluid streams could be used including, air, air enhanced with oxygen, a gas and liquid, e.g., hydrogen peroxide, air/ozone enhanced with hydrogen peroxide, or a hydro peroxide and so forth.

In the illustrated embodiment, microbubbles of air and ozone exit from walls of the directional microporous diffuser 50, 70. The microbubbles of air/ozone affect substantial removal of below-mentioned or similar types of contaminants. The arrangement 10 can also include a pump (not shown) that supplies nutrients such as catalyst agents including iron containing compounds such as iron silicates or palladium containing compounds such as palladized carbon. In addition, other materials such as platinum may also be used.

The microbubbles promote rapid gas/gas/water reactions with volatile organic compounds in which a substrate (catalyst or enhancer) participates in, instead of solely enhancing, dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/ozone combination moves as a fluid into the material to be treated. The use of microencapsulated ozone enhances and promotes in-situ stripping of volatile organics and simultaneously terminates the normal reversible Henry's Law reaction. The process involves promoting simultaneous volatile organic compounds (VOC) in-situ stripping and gaseous decomposition, with moisture (water) and substrate (catalyst or enhancer). The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, CO2 and H2O accomplishes this. In the case of petroleum products like BTEX (benzene, toluene, ethylbenzene, and xylenes), the benzene entering the bubbles reacts to decompose to CO2 and H2O.

Also, pseudo Criegee reactions with the substrate and ozone appear effective in reducing saturated olefins like trichloro alkanes (1,1,1,-TCA), carbon tetrachloride ($CCl_4$), chloroform methyl chloride, and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform. Also, aromatic ring compounds such as oxygenates such as O-xylene, P-xylene, naphthalene and methyltetrabutylether (MTBE), ethyltetrabutylether, and tertiaryamyltylether can be treated.

Ozone is an effective oxidant used for the breakdown of organic compounds in water treatment. The major problem in effectiveness is that ozone has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span, the ozone is injected with directional microporous diffusers, enhancing the selectiveness of action of the ozone. By encapsulating the ozone in fine bubbles, the bubbles preferentially extract a vapor phase fraction of the volatile compounds organic compounds that the bubbles encounter. With this process, a vapor phase according to a partition governed by Henry's Law, of the volatile organics are selectively pulled into the fine air-ozone bubbles. The gas that enters a small bubble of volume ($4\pi r3$) increases until reaching an asymptotic value of saturation. The ozone in the bubbles attacks the volatile organics, generally by a Criegee or Criegee-like reaction.

The following characteristics of the contaminants appear desirable for reaction:

| | |
|---|---|
| Henry's Constant: | $10^{-2}$ to $10^{-5}$ m$^3$ atm/mol |
| Solubility: | 10 to 20,000 mg/l |
| Vapor pressure: | 1 to 3000 mmhg |
| Saturation concentration: | 5 to 9000 mg/kg |

The production of microbubbles and selection of appropriate size distribution are selected for optimized gas exchange through high surface area to volume ratio and long residence time within the area to be treated.

Figure 2:
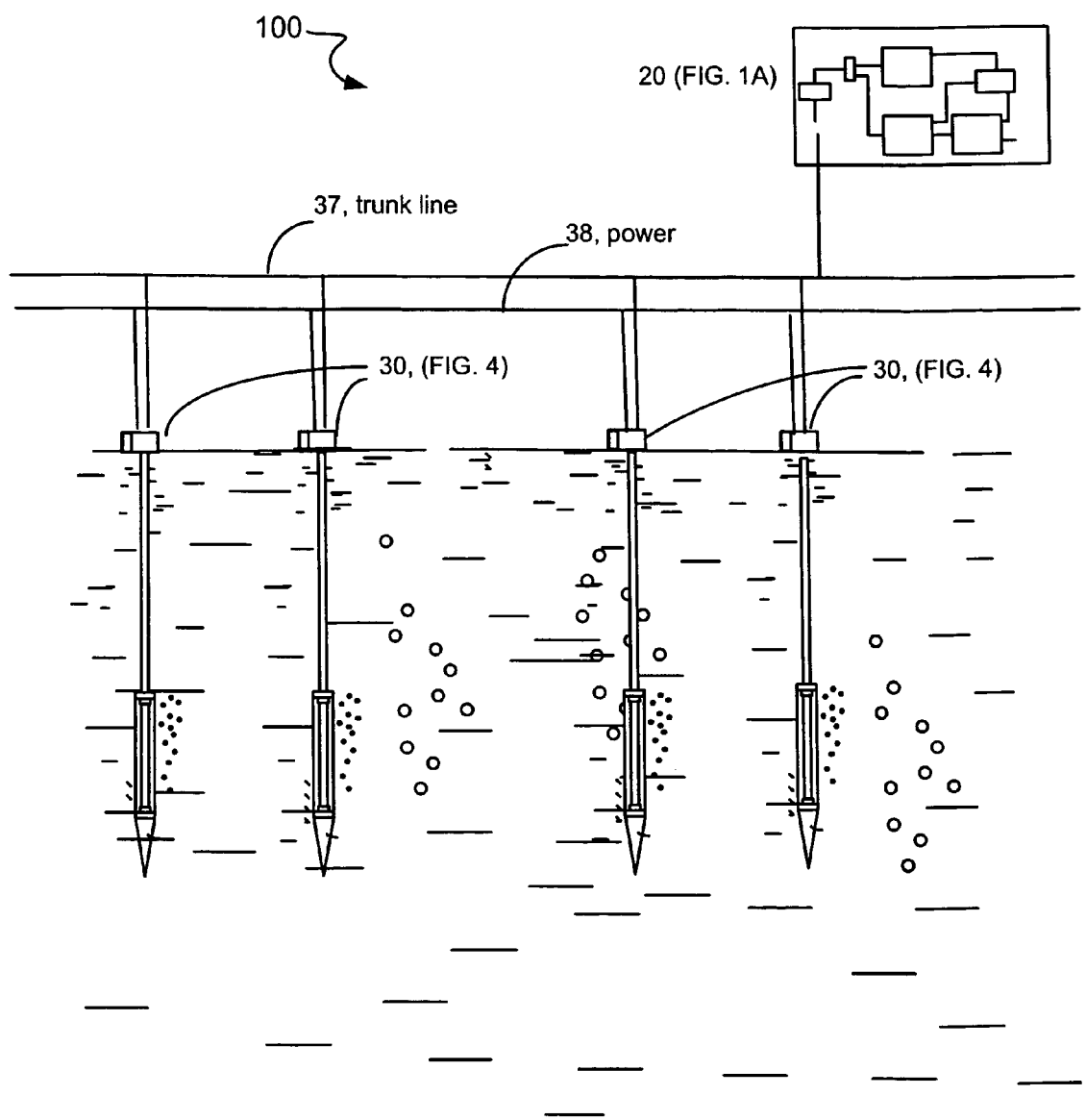
FIG. 2 is a diagrammatical view showing a multi-sparging apparatus installation.
Figure 8:
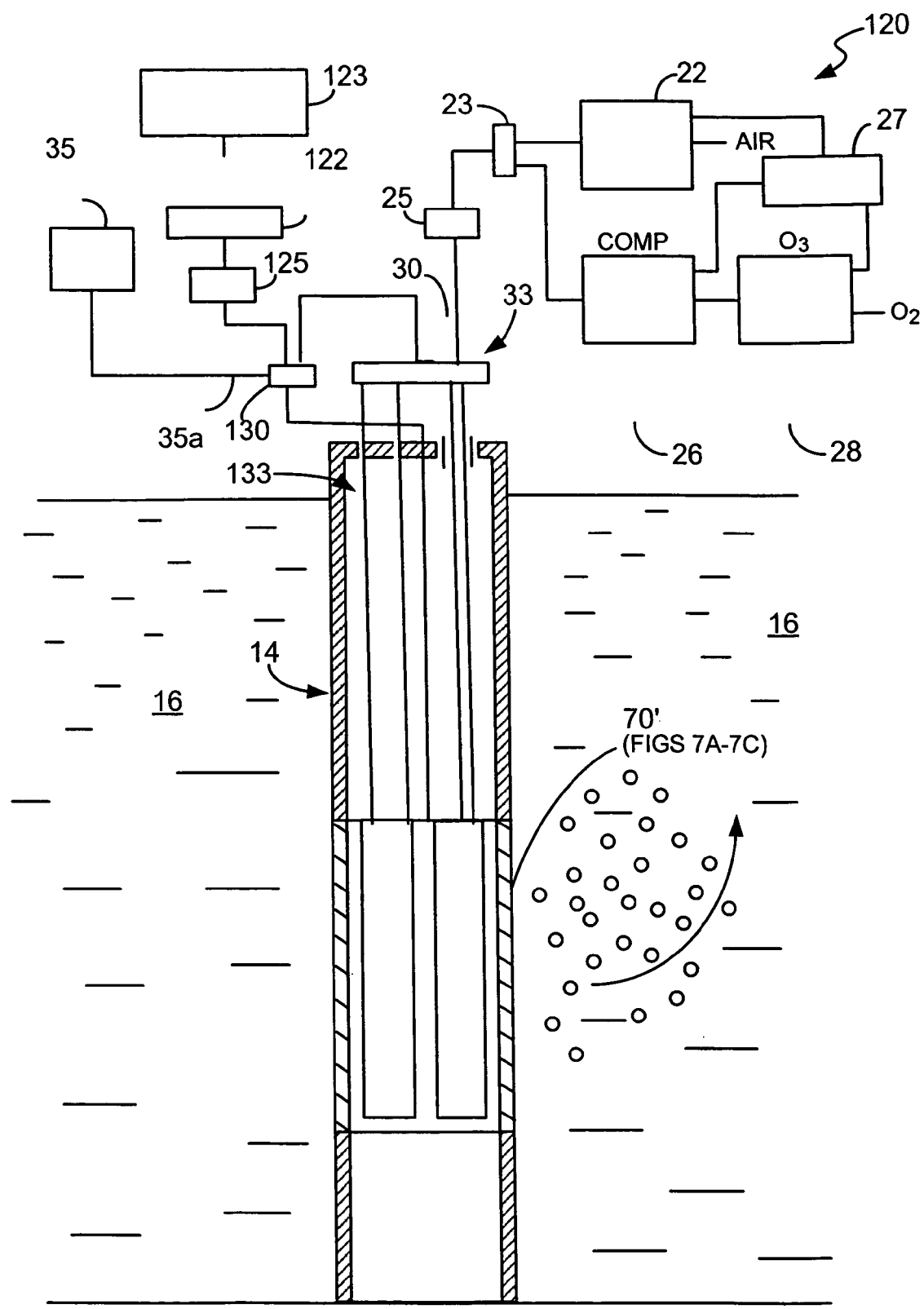
FIG. 8 is a cross-sectional view showing an alternative sparging treatment example.
Figure 9A:
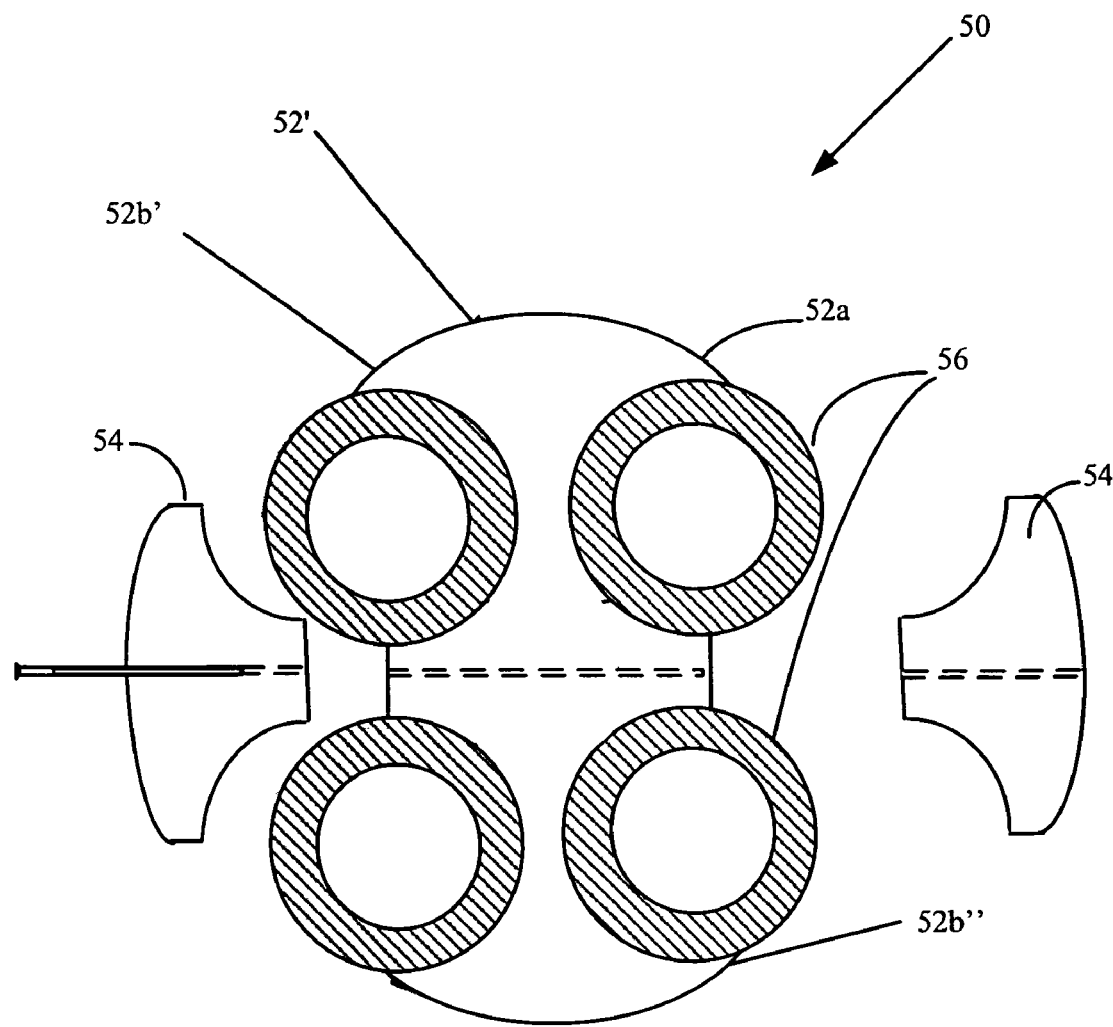
FIGS. 9A-9C are alternative configurations of the diffuser depicted in FIGS. 5A-5D or 7A-7C.
Figure 9B:
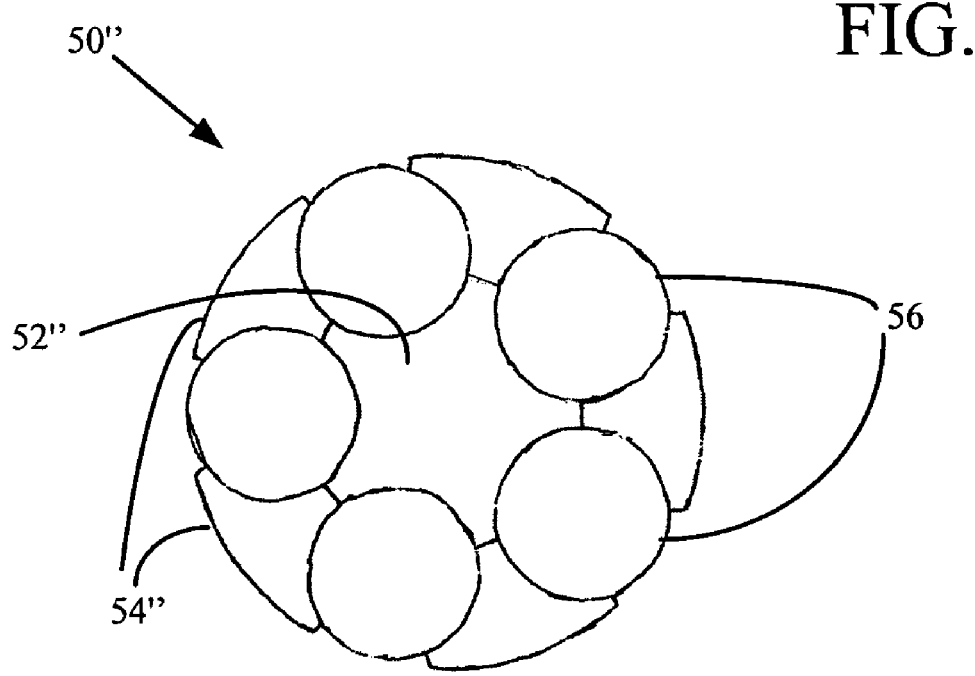
Figure 9C:
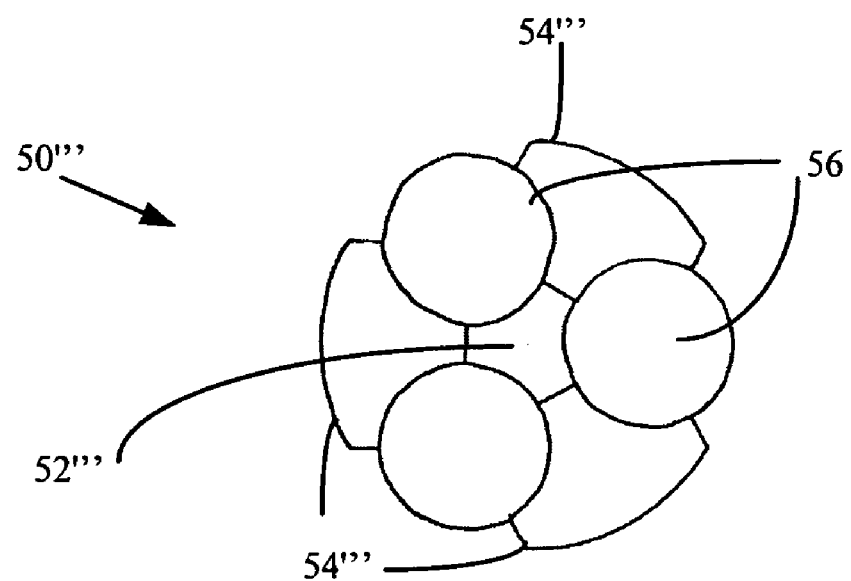

Referring to FIG. 2, an illustrative installation of either treatment example of FIG. 1A or 1B or FIG. 8 (discussed below) is shown. In this example, multiple sparging apparatus (not numbered) here of a type described in FIG. 1B, (although others could be used) are disposed over a site. In this example, "NEMA 4" (explosion proof) boxes enclose solenoids and circuit boards 30 for remotely controlling the time and duration of the directional sparging. Such an arrangement can be used in gasoline spill areas, for example, where electrical circuits and solenoids are isolated from contact with explosive vapors. By having a separate circuit board in the well box, the well box can be placed anywhere along a pressurized main 37 for gas and liquid, as discussed below. Electrical current is supplied via a line 38 to operate the solenoids and circuits 30. This simplifies installations that require a large number of well installations since individual gas and liquid tubing from a master control 20 are not necessary to operate the wellhead.

Figure 3A:
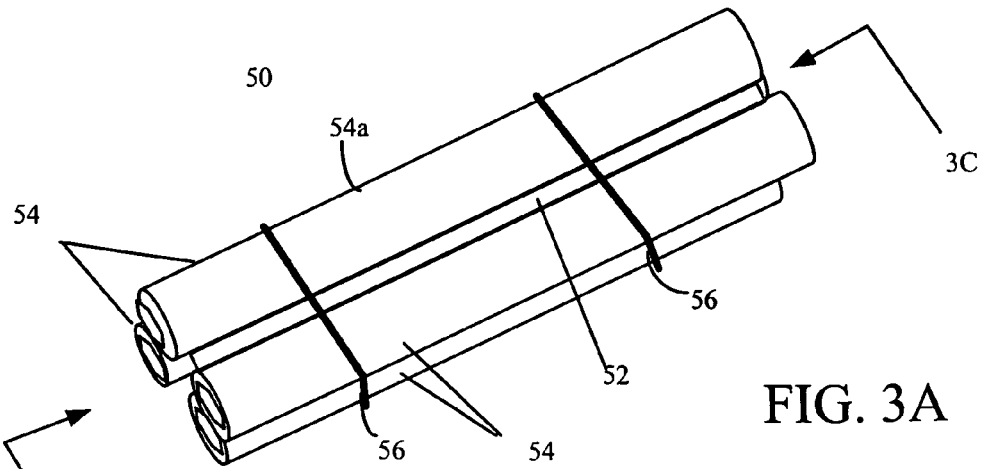
FIGS. 3A-3E are diagrams depicting details of a directional diffuser in the example shown in FIG. 1A or 1B.
Figure 3B:
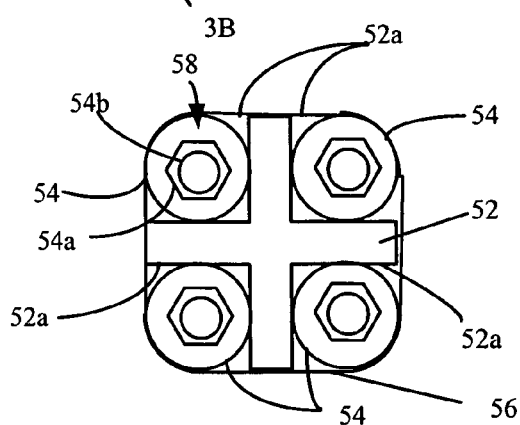
Figure 3C:
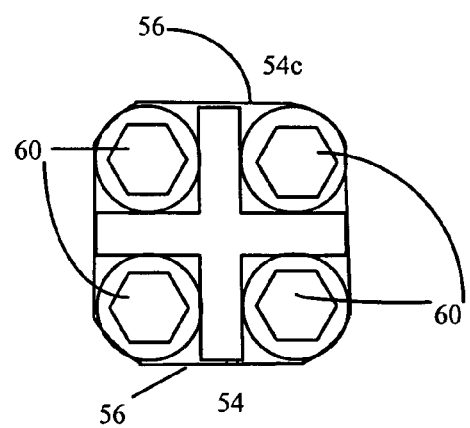

Referring now to FIGS. 3A-3C, exemplary details of a directional microporous diffuser 50 is shown. The directional microporous diffuser 50 includes a holder member 52. The holder member 52 has a plurality of compartments 52a formed by sidewalls 52b of the holder member. The compartments correspond to the number of cylindrical tubes that will be in the microporous diffuser 50. In some embodiments, the sidewalls 52b have a flat surface upon which the cylindrical members rest. Here the holder member 52 is an elongated cross-like shape that will extend a substantial length of the microporous diffuser 50. The microporous diffuser 50 also includes here four (4) cylindrical members or tubes 54, each having a sidewall 54a comprised of a large plurality of micropores. The four (4) cylindrical members or tubes 54 provide four independent diffusers that can be controlled to sequence emission of fluids, e.g., gaseous ozone-air over e.g., 90 degree quadrants or the like depending on the number of and arrangement of the cylindrical tubes 54. Other configurations of fewer or more compartments and corresponding cylindrical (or other shaped) elongated members are possible.

As shown in FIG. 3B, one end 54a of each of the cylindrical members 54 has a pressure fitting 54b threaded into threaded apertures (not shown), in the end 54a of the cylindrical member to provide fluid inlet ports 59 whereas, as shown in FIG. 3C, the other end 54b of the cylindrical members are sealed, via an end plug 60 or the like disposed in threaded (not shown) end portions 54b of the cylindrical members 54. Other arrangements are possible, for instance caps having apertures can be solvent welded to the ends of the cylindrical members instead of providing threads in the cylindrical members. Bands 56, e.g., nylon bands or straps are tightly strapped around the cylindrical members 54 forcing them against the compartments 52a in the holder member 52 and holding them in place. Other arrangements are possible.

The holder member 52 having the compartments 52a within which the cylindrical tubes 54 are held tightly against the sidewalls 52b of the holder member 52, tends to block portions of the tubes 54 from emitting gas in the form of bubbles, e.g., microbubbles, thus producing more pressure to force the bubbles from the unobstructed surfaces of the cylindrical tubes 54 to direct the pattern out over a quadrant and at a higher operating pressure.

Figure 3D:
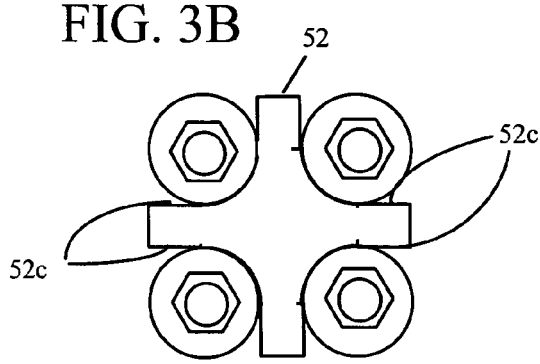

In some embodiments (FIG. 3D), the sidewalls 52b have a contoured surface that would generally follow contours of sidewalls 54c of the cylindrical members 54. Optionally, to increase this tendency to block gas from obstructed portions of the cylindrical tubes 54, the compartments 52a in the holder member 52 can be supplied with a welding solvent to solvent weld the cylindrical tubes 54 into the compartments 52a. Then, depending on operating pressures and the strength of the welds the nylon straps 56 may be omitted.

The cylindrical tubes 54 have a porosity characteristic of slot well-screen or preferably a microporosity characteristic of e.g., 200 microns or less. In some embodiments the cylinders are slot well screen surrounded by a sand pack, e.g., 60 mesh sand pack. Slot sizes are set out below.

| Slot Size | Inches | MM | Microns |
|---|---|---|---|
| 6 | .006 | .15 | 152 |
| 8 | .008 | .20 | 200 |
| 10 | .010 | .25 | 250 |
| 12 | .012 | .30 | 304 |
| 15 | .015 | .37 | 375 |
| 20 | .020 | .50 | 500 |
| 25 | .025 | .62 | 625 |

In other embodiments, the cylinders can be constructed of porous materials having microscopic openings in sidewalls 54c, as disclosed below. In other embodiments a mesh could be used. For example the cylinders of the diffuser can be comprised of a mesh having a mesh size in a range of at least 40 mesh and in particular in a range of, e.g., 40 to 200 mesh.

Figure 3E:
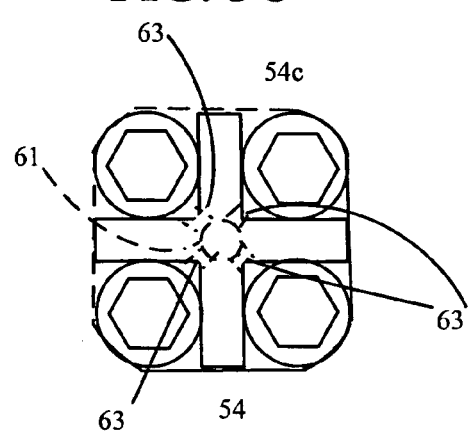

As shown in FIG. 3E, a borehole 61 can be provided through the holder member 32, terminated at the end 54c of the diffuser. The holder can have weep holes 63 provided in the holder at the apex of the holder into the borehole 61. A fitting (not shown) can be provided at the other end of the holder to accommodate connection to a second fluid, e.g., a liquid, as will be generally described in FIG. 8.

Figure 4A:
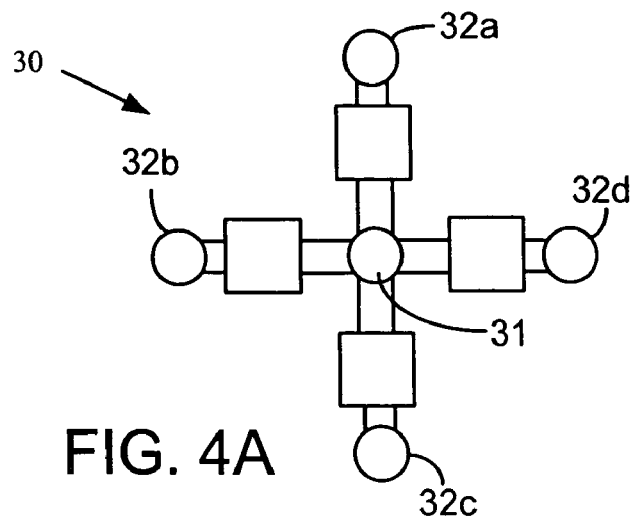
FIGS. 4A-4C are diagrams of solenoid controlled valves.
Figure 4B:
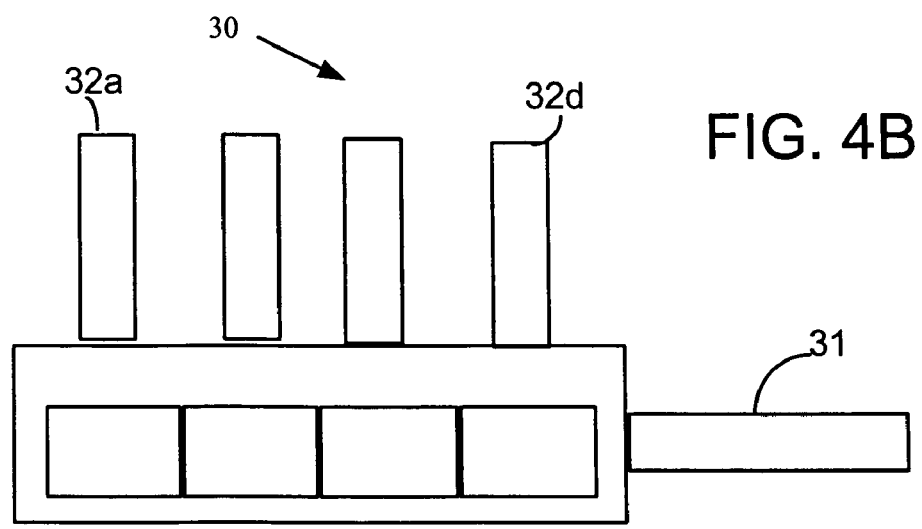
Figure 4C:
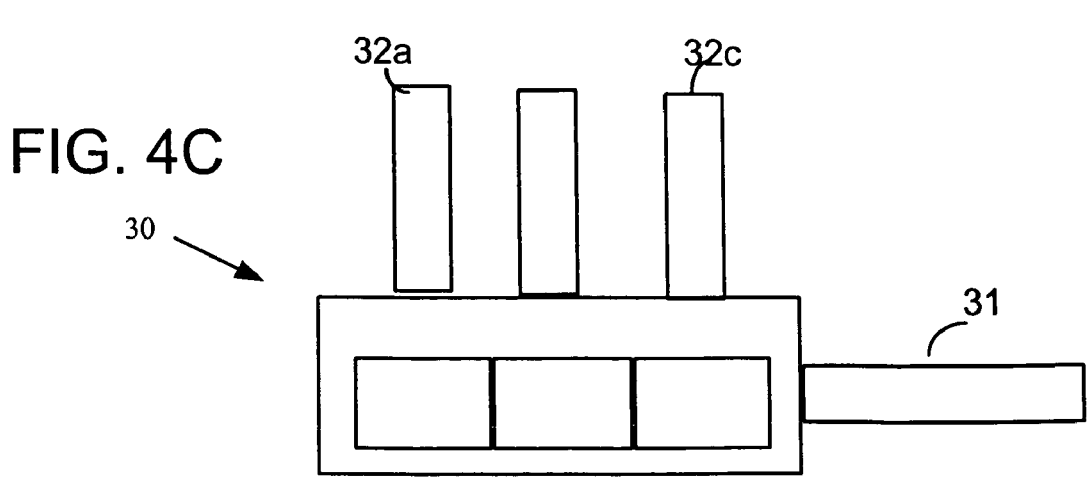

Referring now to FIGS. 4A-4C, examples of solenoid-controlled valve 30 including inlet 31 and the outlet ports 32a-32d are shown (only ports 32a-32c are used for valve 30 of FIG. 4C, which is used with three inlets). Not shown in detail is electrical circuitry 35 that can be used to remotely control the solenoids. When disposed in a wet soil, bubbles or microbubbles emerge from the quadrants in accordance with which one of the inlet ports 58 of the directional microporous diffuser 50 receives the fluid stream from the outlet ports 32a-32d of the solenoid-controlled valve 30. While, the cylindrical member 54 is disclosed as being cylindrical in shape, in general, the configuration could have other shapes.

As mentioned, the cylindrical member 54 has a plurality of microscopic openings constructed through sidewalls 54c. The openings generally have a pore size matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 0.1 to 20 microns, although 10 slot well screen could be used.

The combination of the inlet fittings 58 and end plug 60 seals the cylindrical tubes 54 permitting bubbles, or microbubbles, to escape only via the porous construction of the sidewalls of the cylindrical tubes.

The use of plural cylindrical tubes 54 in the diffuser 50 together with the solenoid valve 30 permits a gas stream from the central feed to be directed through one, two, three or all four of the quadrants of the directional microporous diffuser 50. Thus, the pattern of the gas stream that exits from the directional microporous diffuser can be sequenced. In general, using a single quadrant at a time permits the bubbles to exit the directional microporous diffuser and have a generally elliptical shaped zone of influence in the surrounding soil formation. That is, by directing the gas stream from the feed line to one of the cylindrical tubes, the gas stream exits in the form of bubbles from unobstructed surface of the tubes providing a zone of influence that extends further in a direction perpendicular to the directional microporous diffuser 50 than tangential to the directional microporous diffuser 50. The treatment zone has a longer radius perpendicular to the surface of the directional microporous diffuser than the treatment zone that could be provided were the arrangement used with conventional microporous diffuser.

The solenoid-controlled valve 30 can be controlled to rotate the pattern of microbubbles emitted from the directional microporous diffuser 50 by permitting microbubbles to exit from only a first quadrant, then only a second quadrant, and so forth. The control can be automated or manual. The directional microporous diffuser 50 allows fewer wells and sparging arrangements 10 to be constructed on a site for a given sparging arrangement capacity by directing all of the capacity of the pumps and so forth into a single quadrant of a directional microporous diffuser at any one time. The directional microporous diffuser 50 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

The arrangement can also be used to treat contaminants that exist under road beds, buildings or other areas in which it is not feasible to directly drill wells. Since the directional microporous diffuser 50 can direct all of the fluid supplied to the solenoid controlled value to one of the cylindrical tubes 54 and though less than the entire surface area of the one cylindrical tube, the effective radius of influence is concomitantly greater than prior approaches for a given pressure and flow rate of fluid.

Referring now to FIGS. 5A-5D, exemplary details of an alternative, directional microporous diffuser 70 that allows adjusting of a shape of a bubble pattern is shown. The directional microporous diffuser 70 includes a holder member 72. The holder member 72 has a plurality of compartments 72*a* formed by sidewalls 72*b* of the holder member and has a plurality of attachment surfaces 72*c* disposed between adjacent compartments 72*a*. The compartments 72*a* correspond to the number of cylindrical tubes that will be in the microporous diffuser 50 and the attachment surfaces 72*a* provide attachment regions for holder pieces 74. Each of the holder pieces has a base 74*a* that attaches to the attachment surface 72*c* of the holder 72, an opposing outer surface 74*b*, and sidewalls 74*c* having a contoured surface that would generally follow contours of cylindrical members 78. A pair of sidewalls 74*c* from neighboring holder pieces 74 and the compartment 72*a* disposed between the neighboring holder pieces 74 provides a composite compartment that holds a cylindrical tube 78.

Bore holes 79 are disposed through the holder pieces 74 aligned with tapped screw holes in holder member 74 for screws (not labeled) to attach the holder pieces 74 to the holder 72. Other fastening could be used. Here the holder member 72 is an elongated cross-like shape that will extend a substantial length of the microporous diffuser 70.

The microporous diffuser 70 also includes here four (4) cylindrical members or tubes 78, each having a sidewall comprised of a large plurality of micropores. The four (4) cylindrical members or tubes 78 provide four, independent diffusers that can be controlled to sequence emission of fluids, e.g., gaseous ozone-air over e.g., 90 degree quadrants or the like depending on the number of and arrangement of the cylindrical tubes 78. Top and sides views of the directional microporous diffuser are illustrated in FIGS. 5B and 5C.

Figure 5A:
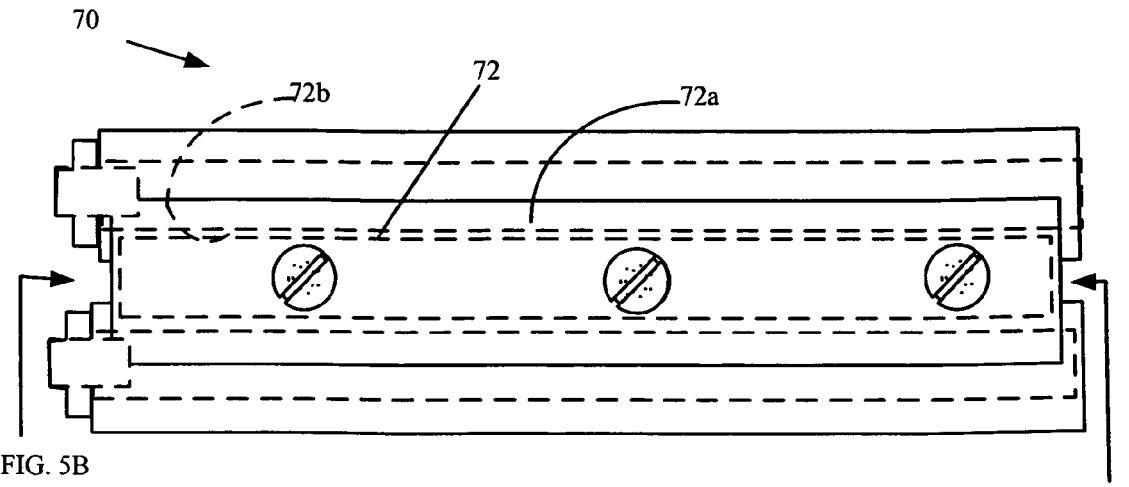
FIGS. 5A-5D are diagrams depicting details of a directional diffuser in the example shown in FIG. 1A or 2B.
Figure 5B:
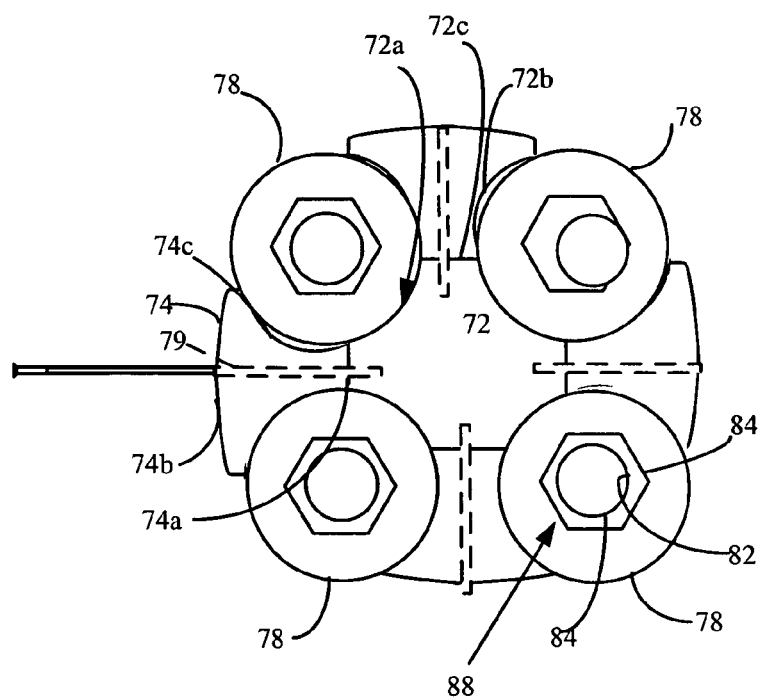
Figure 5C:
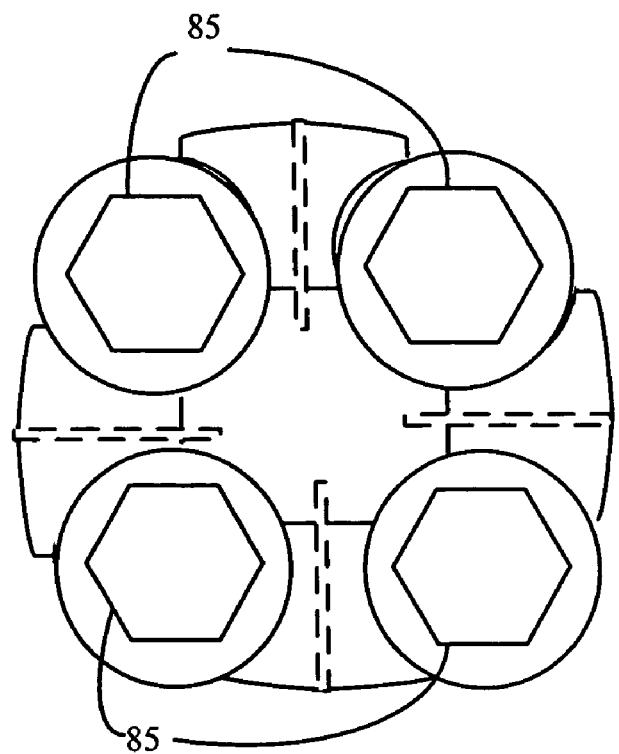

As shown in FIG. 5B, one end 78*a* of the cylindrical members has a pressure fitting 84, threaded into threaded apertures (not shown), in the end of the cylindrical member 78 to provide fluid inlet ports 88, whereas, the other end 78*b* (FIG. 5C) of the cylindrical members 78 are sealed, via an end plug 85 or the like. Other arrangements, e.g., welding are possible.

The holder member 72 having the compartments 72*a* within which the cylindrical tubes 78 are held tightly against the sidewalls 72*b* of the holder member 72, tends to block portions of the tubes from emitting gas in the form of bubbles, e.g., microbubbles, thus producing more pressure to force the bubbles from the unobstructed surfaces of the cylindrical tubes 78 to direct the pattern out over a quadrant and at a higher operating pressure. Optionally, to increase this tendency to block gas from obstructed portions of the cylindrical tubes 78, the compartments 72*a* in the holder member 72 can be supplied with a welding solvent to solvent weld the cylindrical tubes 78 into the compartments 72*a*.

As above, the cylindrical members 74 have a porosity characteristic of 10 slot well screen or a microporosity characteristic of e.g., 200 microns or less. When disposed in a wet soil, bubbles or microbubbles emerge from the quadrants in accordance with which one of the inlet ports 88 of the directional microporous diffuser 70 receives the fluid stream from the outlet ports 32*a*-32*d* of the solenoid-controlled valve 30 (FIG. 4).

While the cylindrical member 78 is disclosed as being cylindrical in shape, in general, the configuration could have other shapes.

As mentioned above for cylindrical member 54 (FIGS. 3A-3C) cylindrical member 78 has a plurality of microscopic openings constructed through sidewalls 78*a*. The openings generally have a pore size matched to a surrounding ground formation so as to be effective for inducing gas/gas reactions with introduction of the microbubbles. Sidewalls of each of the cylindrical members can have a pore diameter in a range of 1-200 microns, preferably 1-80 microns and more preferably 0.1-20 microns, although 10 slot well screen could be used.

The combination of the inlet ports 88 and end plug 85 seals the cylindrical tubes 78 permitting bubbles, or microbubbles, to escape only via the porous construction of the sidewalls of the cylindrical tubes.

The use of plural cylindrical tubes 78 in the diffuser 70 together with the solenoid valve 30 permits a gas stream from the central feed to be directed through one, two, three or all four of the quadrants of the directional microporous diffuser 70. Also, as mentioned, the holder pieces 74 allow various shaped patterns, e.g., an ellipsoidal pattern when the gas stream exits from all four cylindrical members 78 or an effectively ellipsoidal pattern, when the directional microporous diffuser 70 is sequenced. In general, using a single quadrant at a time permits the bubbles to exit the directional microporous diffuser and have a generally elliptical shaped zone of influence in the surrounding soil formation. That is, by directing all of the gas stream from the feed line to one of the cylindrical tubes, the gas stream exits in the form of bubbles from unobstructed surface of the tubes providing a zone of influence that extends further in a direction perpendicular to the directional microporous diffuser 50 than tangential to the sidewalls of the directional microporous diffuser 50. The treatment zone has a longer radius perpendicular to the surface of the directional microporous diffuser than the treatment zone that could be provided were the arrangement used with conventional microporous diffuser.

The solenoid-controlled valve 30 can be controlled to sequence the pattern of microbubbles emitted from the directional microporous diffuser 70 by permitting microbubbles to exit from only a first quadrant, then only a second quadrant, and so forth. The control can be automated or manual. The directional microporous diffuser 50 allows fewer wells and sparging arrangements 10 to be constructed on a site for a given sparging arrangement capacity by directing all of the capacity of the pumps and so forth into a single quadrant of a directional microporous diffuser 70 at any one time. The directional microporous diffuser 70 can also be used to direct treatment towards especially high concentrations of contaminants while minimizing treatment materials in areas of lower contaminant concentrations. Once a first region is treated, the solenoid can be activated to close the outlet that feeds the first quadrant that treated the first region and open a second outlet of the solenoid to feed a second, different quadrant and treat a second different region.

Figure 5D:
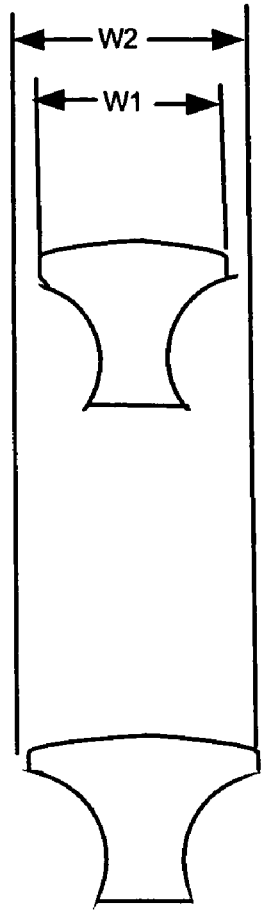

As above with diffuser 50, the diffuser 70 can also be used to treat contaminants that exist under road beds, buildings or other areas in which it is not feasible to directly drill wells. Since the directional microporous diffuser 50 can direct all of the fluid supplied to the solenoid controlled value to one of the cylindrical tubes 54 and though less than the entire surface area of the one cylindrical tube, the effective radius of influence is concomitantly greater than prior approaches for a given pressure and flow rate of fluid. Moreover, unlike diffuser 50, diffuser 70 can further shape the beam of fluid that exits from any particular cylindrical member 78 by judicious selection of the widths, e.g., W1 and W2 of the holder pieces 74, as shown in FIG. 5D.

Figure 6A:
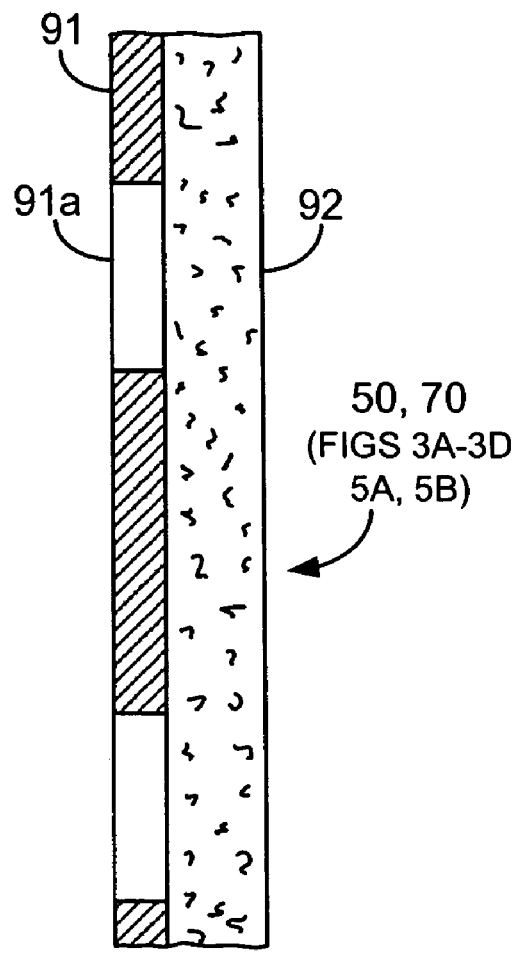
FIGS. 6A and 6B are cross-sectional view of sidewalls of the directional diffusers of FIGS. 3A-3c, 5A-5C and 7A-7C showing exemplary construction details.
Figure 6B:
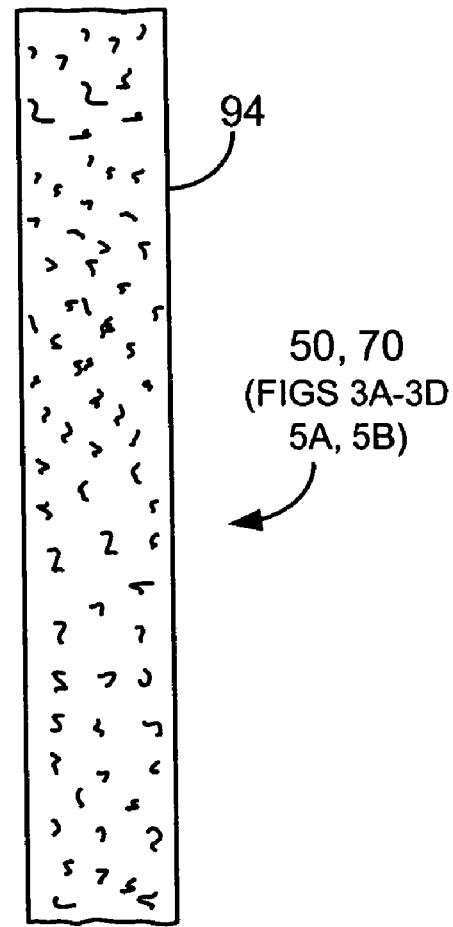

Referring now to FIGS. 6A, 6B details of sidewalls of the directional microporous diffusers 50, 70 are shown. FIG. 6A shows that sidewalls of the members can be constructed from a metal or a plastic support layer 91 having large (as shown) or fine perforations 91a over which is disposed a layer of a sintered i.e., heat fused microscopic particles of plastic. The plastic can be any hydrophobic material such as polyvinylchloride, polypropylene, polyethylene, polyvinylidene, (PVDF), polytetrafluoroethylene, high-density polyethylene (HDPE) and ABS. The support layer 91 can have fine or coarse openings and can be of other types of materials. Other materials are possible such as porous stainless steel and so forth.

FIG. 6B shows an alternative arrangement 94 in which sidewalls of the members are formed of a sintered i.e., heat fused microscopic particles of plastic. The plastic can be any hydrophobic material such as polyvinylchloride, polypropylene, polyethylene, polyvinylidene, (PVDF), polytetrafluoroethylene, high-density polyethylene (HDPE) and alkylbenzylsulfonate (ABS).

The fittings (e.g., the inlets in FIGS. 3A-3D, 5A-5C) can be threaded and are attached to the inlet cap members by epoxy, heat fusion, solvent or welding with heat treatment to remove volatile solvents or other approaches. Standard threading can be used, for example, NPT (national pipe thread) or box thread e.g., (F480). The fittings are securely attached to the directional microporous diffusers in a manner that insures that the directional microporous diffusers can handle pressures that are encountered with injecting of the air/ozone.

Referring now to FIGS. 7A-7C, an alternate embodiment 70' of the directional microporous diffuser 70 is shown. The alternative, directional microporous diffuser 70' allows adjusting of a shape of a bubble pattern as with 70 (FIGS. 5A-5C) and allows a second fluid, e.g., a liquid to be dispersed along with the first fluid from the cylindrical tubes 74. The directional microporous diffuser 70' includes a holder member 72', similar in construction to holder member 72 discussed above. Here the holder member 72' has, in addition to the features disclosed from holder member 72, a borehole 73 through the length of the holder member, with one end of the borehole 73 having a threaded region to receive a fitting 73a. The other end of the borehole 73 can be plugged or terminated inside of the holder member 72. In other respects, the microporous diffuser 70' is similar or the same in construction as microporous diffuser 70. The holder pieces 74' are similar in construction to those 74 of diffuser 70 (FIGS. 5A-5C); however, they include one or more liquid outlet ports 75, e.g., apertures through the thickness of the holder pieces and through the holder member terminating in the borehole 73, such that liquid or another fluid that is fed through the borehole can exit from the diffuser 70'.

As above with diffuser 50 and diffuser 70, the diffuser 70' can also be used to treat contaminants that exist under road beds, buildings or other areas in which it is not feasible to directly drill wells. As with diffuser 70, diffuser 70' can further shape the beam of fluid that exits from any particular cylindrical member 78 by judicious selection of the widths "W" of the holder pieces 74.

The gas stream that exits from cylindrical members 78 mixes with, e.g., liquid from the outlets to coat microbubbles with a liquid coating of, e.g., water or hydrogen peroxide or a hydro peroxide. Other known liquid de-contaminant agents could be used. In general, using a single quadrant at a time permits the coated microbubbles to exit the directional microporous diffuser 70 over the sidewall surface of a single quadrant. The coated microbubbles cover a generally elliptical shaped zone of influence in the surrounding soil formation, as discussed above for directional microporous diffuser 50 and 70.

Referring to FIG. 8, an example of a sparging arrangement 120 using the directional microporous diffuser 70' is shown. The sparging arrangement 120 includes a source 123 (of liquid and catalysts, and/or nutrients) and a pump 122 coupled to a check valve 125 and a second solenoid-controlled valve 130. The second solenoid-controlled valve 130 has an outlet coupled to liquid feed line 133 that is coupled to inlet port 73*a* of the directional microporous diffuser 70'. The directional microporous diffuser 70' receives liquid, catalysts, and/or nutrients, which mixes in the directional microporous diffuser 70' with the gaseous stream provided via feed lines 33 to provide an emulsion of microbubbles and liquid, or catalysts etc. and preferably coated microbubbles and so forth, as in the patents mentioned above, e.g., U.S. Pat. No. 6,582,611 or 6,436,285 for instance. Otherwise, the arrangement 120, as shown in FIG. 8, is analogous to the arrangements 10, 100 shown in FIG. 1A or 1B but for the addition of the pump 122, source 123, check valve 125, feed line 133 and the second solenoid-controlled valve 130. The control arrangement 35 is shown controlling both solenoid-controlled valves 30 and 130.

Referring now to FIG. 9A, another construction 50' for the directional microporous diffuser 50 is shown. The directional microporous diffuser 50' includes a holder member 52'. The holder member 52' has four compartments 52*a*' formed as two pairs of adjacent compartments on opposing sidewalls 52*b*' 52*b*" of the holder member 52'. The compartments 52*a*' correspond to the number of cylindrical tubes that will be in the microporous diffuser 50'. A pair of holder pieces 54 is used to secure the cylindrical tubes 56 to the holder 52'.

Other configurations of fewer or more compartments and corresponding cylindrical (or other shaped) elongated members are possible. Other alternative arrangements are shown in FIGS. 9B and 9C.

Referring now to FIG. 9B, another construction 50" for the directional microporous diffuser 50 includes a holder member 52". The holder member 52" has five compartments 52*a*". The compartments 52*a*" correspond to the number of cylindrical tubes that will be in the microporous diffuser 50". Five holder pieces 54" are used to secure the cylindrical tubes 56 to the holder 52".

Referring now to FIG. 9C, another construction 50''' for the directional microporous diffuser 50 includes a holder member 52'''. The holder member 52''' has three compartments 52*a*'''. The compartments 52*a*''' correspond to the number of cylindrical tubes that will be in the microporous diffuser 50'''. Three holder pieces 54" are used to secure the cylindrical tubes 56 to the holder 52'''.

Similar arrangements with a borehole as in FIGS. 7A-7C can be provided for the constructions 50'-50'''.

A number of embodiments of the invention have been described. Nevertheless, it will be understood that various modifications may be made without departing from the spirit and scope of the invention.

What is claimed is:

1. A microporous diffuser comprises:

a holder member having plural compartments, each compartment having a generally partially circular sidewall;

plural hollow, cylindrical tubes having porous sidewalls, the plural hollow, cylindrical tubes supported in the plural compartments of the holder member with each hollow, cylindrical tubes, including:

an inlet port at a first end of the cylindrical tubes with a second end of the cylindrical tube being sealed.

2. The microporous diffuser of claim 1 wherein the holder member is elongate, and with the cylindrical tubes having a porosity characteristic of 10 slot well-screen or less.

3. The microporous diffuser of claim 1 wherein sidewalls of the cylindrical tubes have a porosity characteristic of less than 200 microns.

4. The microporous diffuser of claim 1 wherein cylindrical tubes are comprised of a metal or a plastic.

5. The microporous diffuser of claim 1 further comprising:
at least one member disposed to hold the plural cylindrical tubes in the compartments of the holder member.

6. The microporous diffuser of claim 1, wherein the compartments are arranged in quadrants and wherein there are four cylindrical tubes.

7. A microporous diffuser comprises:
plural hollow elongate members each having porous sidewalls;
plural inlets to receive a fluid and to emit at least one stream of the fluid into a soil formation through sidewalls of at least one of the plural hollow, elongate members, the elongate members supported in plural compartments of a holder member.

8. The microporous diffuser of claim 7 wherein the inlets are coupled to one end of the plural hollow, elongate members with opposing ends of the plural hollow, elongate members being sealed.

9. The microporous diffuser of claim 7 wherein fluids fed to the inlets provide plural streams from the diffuser.

10. The microporous diffuser of claim 7 wherein the elongate members are comprised of well screen.

11. The microporous diffuser of claim 7 wherein the diffuser emits microbubbles having a bubble diameter of less than 200 microns.

12. The microporous diffuser of claim 7 wherein the diffuser is configured to be driven into the ground.

13. The microporous diffuser of claim 7 wherein the diffuser is configured be disposed in a well.

14. The microporous diffuser of claim 7 wherein the diffuser emits microbubbles having a size in a range of 1 to 200 microns.

15. The microporous diffuser of claim 7 wherein the plural hollow elongate members are comprised of 10 slot well-screen.

16. The microporous diffuser of claim 7 wherein the plural hollow elongate members are comprised of a mesh having a mesh size in a range of 40 to 200 mesh.

17. The microporous diffuser of claim 7 further comprising:
at least one band disposed about the plural members to hold the plural members.

18. A microporous diffuser comprises:
plural hollow elongate members each having porous sidewalls;
a holder member supporting the plural hollow, elongate members;
plural band members disposed about the plural members to hold the plural members in the holder member; and
plural inlets to receive a fluid and to emit at least one stream of the fluid into a soil formation through sidewalls of at least one of the plural hollow, elongate members.

19. The microporous diffuser of claim 18 wherein the inlets are coupled to one end of the plural hollow, elongate members with opposing ends of the plural hollow, elongate members being sealed.

20. The microporous diffuser of claim 18 wherein fluids fed to the inlets provide plural streams from the diffuser.

21. The microporous diffuser of claim 18 wherein the diffuser emits microbubbles having a bubble diameter of less than 200 microns.

22. The microporous diffuser of claim 18 wherein the diffuser is configured to be driven into the ground.

23. The microporous diffuser of claim 18 wherein the diffuser is configured be disposed in a well.

24. The microporous diffuser of claim 18 wherein the plural hollow elongate members are comprised of at least a first one of well screen, a mesh having a mesh size in a range of 40 to 200 mesh or porous plastic pipe having a porosity of less than 200 microns.

* * * * *

UNITED STATES PATENT AND TRADEMARK OFFICE
CERTIFICATE OF CORRECTION

PATENT NO. : 7,651,611 B2
APPLICATION NO. : 11/485223
DATED : January 26, 2010
INVENTOR(S) : William B. Kerfoot It is certified that error appears in the above-identified patent and that said Letters Patent is hereby corrected as shown below:

Item (57) Abstract, line 8, "including a an" should read --including an--;
Column 1, line 51, "of 10 slot well-screen" should read --of a 10 slot well screen--;
Column 2, line 5, "diffuser is 10 slot well-" should read --diffuser is a 10 slot well--;
  line 28, "characteristic of 10" should read --characteristic of a 10--;
  line 56, "characteristic of 10 slot well-screen" should read --characteristic of a 10 slot well screen--;
Column 7, line 42, "slot well-screen" should read --a slot well screen--; line 44, "well screen" should read --well screens--;
Column 8, line 2, "accommodate connection" should read --accommodate a connection--; line 23, "although 10" should read --although a 10--;
Column 9, line 61, "of 10 slot" should read --of a 10 slot--;
Column 10, line 12, "although 10 slot" should read --although a 10 slot--;
Column 13, line 5, claim 2, "of 10 slot well-screen" should read --of a 10 slot well screen--;
  line 39, "configured be disposed" should read --configured to be disposed--;
Column 14, line 2, claim 15, "of 10 slot well-" should read --of a 10 slot well--;
  line 35, "is configured be disposed" should read --is configured to be disposed--;
  line 38, "of well screen" should read --of a well screen--;

Signed and Sealed this

Thirtieth Day of March, 2010

David J. Kappos
*Director of the United States Patent and Trademark Office*